(12) United States Patent
Matsuura

(10) Patent No.: US 11,506,521 B2
(45) Date of Patent: Nov. 22, 2022

(54) OPTICAL FIBER CHARACTERISTICS MEASUREMENT APPARATUS AND OPTICAL FIBER CHARACTERISTICS MEASUREMENT METHOD

(71) Applicant: Yokogawa Electric Corporation, Musashino (JP)

(72) Inventor: Satoshi Matsuura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 107 days.

(21) Appl. No.: 17/273,411

(22) PCT Filed: Aug. 23, 2019

(86) PCT No.: PCT/JP2019/033132
§ 371 (c)(1),
(2) Date: Mar. 4, 2021

(87) PCT Pub. No.: WO2020/050070
PCT Pub. Date: Mar. 12, 2020

(65) Prior Publication Data
US 2021/0325210 A1 Oct. 21, 2021

(30) Foreign Application Priority Data
Sep. 7, 2018 (JP) .............................. JP2018-167896

(51) Int. Cl.
*G01D 5/353* (2006.01)
(52) U.S. Cl.
CPC ......... *G01D 5/35364* (2013.01); *G01D 5/353* (2013.01)

(58) Field of Classification Search
CPC .......................... G01D 5/35364; G01D 5/353
See application file for complete search history.

(56) References Cited

U.S. PATENT DOCUMENTS 9,983,095 B2 * 5/2018 Matsuura ........... G01D 5/35364
11,047,767 B2 * 6/2021 Furukawa .......... G01D 5/35306
(Continued)

FOREIGN PATENT DOCUMENTS

JP  2007-225488 A  9/2007
JP  2009-139241 A  6/2009
(Continued)

*Primary Examiner* — Seung C Sohn
(74) *Attorney, Agent, or Firm* — Sughrue Mion, PLLC

(57) ABSTRACT

An optical fiber characteristics measurement apparatus (1) includes: a light source (11) configured to output continuous light (L1) of which frequency is modulated; a first optical splitter (12) configured to split the continuous light into pump light (LP) and reference light (LR); a pulser (13) configured to pulse the pump light; a second optical splitter (14) configured to cause the pulsed pump light to be incident from one end of an optical fiber (FUT) and output backscattered light (LS) generated due to Brillouin scattering in the optical fiber; a detector (17) configured to detect interference light between the backscattered light and the reference light; a cutout unit (18, 20a, 34, 41, 42a) configured to cut out a detection signal output from the detector at predetermined time intervals; and a measurer (19, 35a, 35b) configured to measure characteristics of the optical fiber individually using the detection signal for each of the predetermined time intervals cut out by the cutout unit.

20 Claims, 5 Drawing Sheets

(56) References Cited

U.S. PATENT DOCUMENTS

| | | |
|---|---|---|
| 2006/0018586 A1 | 1/2006 | Kishida |
| 2017/0067794 A1 | 3/2017 | Matsuura et al. |
| 2017/0248448 A1 | 8/2017 | Horiguchi |

FOREIGN PATENT DOCUMENTS

| | | |
|---|---|---|
| JP | 2015-197384 A | 11/2015 |
| JP | 2017-053645 A | 3/2017 |
| JP | 2017-156094 A | 9/2017 |

* cited by examiner

OPTICAL FIBER CHARACTERISTICS MEASUREMENT APPARATUS AND OPTICAL FIBER CHARACTERISTICS MEASUREMENT METHOD

CROSS REFERENCE TO RELATED APPLICATIONS

This application is a National Stage of International Application No. PCT/JP2019/033132 filed on Aug. 23, 2019, claiming priority based on Japanese Patent Application No. 2018-167896 filed on Sep. 7, 2018, the entire contents of each of which are herein incorporated by reference in their entireties.

TECHNICAL FIELD

The present invention relates to an optical fiber characteristics measurement apparatus and an optical fiber characteristics measurement method.

BACKGROUND ART

An optical fiber characteristics measurement apparatus is an apparatus that causes continuous light or pulse light to be incident on a measurement optical fiber, receives scattered light or reflected light generated in the measurement optical fiber, and measures a temperature distribution, a strain distribution, and other characteristics in a length direction of the measurement optical fiber. In this optical fiber characteristics measurement apparatus, a measurement optical fiber itself is used as a sensor because the received scattered light or reflected light changes according to a physical quantity (for example, temperature or strain) that affects the measurement optical fiber.

Such an optical fiber characteristics measurement apparatus may be an optical fiber characteristics measurement apparatus of a Brillouin optical correlation domain reflectometry (BOCDR) type. This BOCDR type optical fiber characteristics measurement apparatus causes pump light that is frequency-modulated continuous light to be incident from one end of a measurement optical fiber, receives interference between Brillouin scattered light emitted from one end of the measurement optical fiber and reference light (light frequency-modulated like pump light), and obtains a Brillouin frequency shift amount to measure characteristics of the measurement optical fiber.

In the BOCDR type optical fiber characteristics measurement apparatus, the Brillouin scattered light at a specific position at which a "correlation peak" appears in the measurement optical fiber due to the interference between the Brillouin scattered light and the reference light is selectively extracted. Here, an interval between the correlation peaks in the measurement optical fiber is inversely proportional to a modulation frequency of the pump light and the reference light. Further, it is possible to move the correlation peak in a length direction of the measurement optical fiber by sweeping modulation frequencies of the pump light and the reference light. Therefore, it is possible to measure a temperature distribution and a strain distribution in the length direction of the measurement optical fiber by obtaining the Brillouin frequency shift amount at the position at which each correlation peak appears while moving the correlation peaks.

In the BOCDR type optical fiber characteristics measurement apparatus, when a length of the measurement optical fiber is longer than the interval between the correlation peaks described above, a plurality of correlation peaks appear in the measurement optical fiber. In such a case, one of the plurality of correlation peaks is selected, only the Brillouin scattered light at the position at which the selected correlation peak appears is extracted, and the Brillouin scattered light at the positions at which the other correlation peaks appear is not extracted so that crosstalk is avoided. One scheme for selecting such a correlation peak is a scheme called a temporal gate method.

The temporal gate method is a method of shaping pump light into a pulse shape, causing the light to be incident on a measurement optical fiber, and adjusting a reception timing of Brillouin scattered light to select an arbitrary correlation peak of the measurement optical fiber. Here, the pump light is shaped so that a pulse width is shorter than the interval between the correlation peaks, such that only one of the plurality of correlation peaks is selected. Hereinafter, the pump light shaped in this way is referred to as "pump pulse light". For details of the temporal gate method, refer to, for example, Patent Literature 1 below.

CITATION LIST

Patent Literature

[Patent Literature 1]
Japanese Unexamined Patent Application Publication No. 2009-139241

SUMMARY OF INVENTION

Technical Problem

Incidentally, a temporal gate method of the related art is a scheme for causing pump pulse light to be incident on a measurement optical fiber and adjusting a reception timing of Brillouin scattered light to select an arbitrary correlation peak of the measurement optical fiber, as described above. Therefore, in the temporal gate method of the related art, next pump pulse light cannot be caused to be incident on the measurement optical fiber until Brillouin scattered light (Brillouin scattered light at the other end of the measurement optical fiber), which is obtained by the pump pulse light reaching the other end of the measurement optical fiber, returns to the one end of the measurement optical fiber after the pump pulse light is incident from one end of the measurement optical fiber.

That is, in the temporal gate method of the related art, it is necessary for next pump pulse light to be caused to be incident on the measurement optical fiber after a time (hereinafter referred to as a "measurement waiting time"), which is a time required for one beam of pump pulse light to reciprocate in the measurement optical fiber after the pump pulse light is incident on the measurement optical fiber) plus a width (time width) of the pump pulse light, has elapsed. When the next pump pulse light is incident on the measurement optical fiber before the measurement waiting time elapses, Brillouin scattered light at different positions at which different correlation peaks appear is received at the same time, and crosstalk is generated as a measurement error.

The temporal gate method of the related art is a scheme for selecting one of a plurality of correlation peaks using one beam of pump pulse light and extracting only the Brillouin scattered light at a position at which the selected correlation peak appears. Here, in the temporal gate method of the related art, a time interval (period) at which the pump pulse light is incident on the measurement optical fiber cannot be shorter than the above-described measurement waiting time. Therefore, in the optical fiber characteristics measurement apparatus that is used in the temporal gate method of the related art, there is a problem that a time required for measurement becomes greatly longer when characteristics in a length direction of the measurement optical fiber are intended to be measured over a wide range.

The present invention has been made in view of the above circumstances, and an object of the present invention is to provide an optical fiber characteristics measurement apparatus and an optical fiber characteristics measurement method capable of shortening a time required for measurement of characteristics of a measurement optical fiber as compared with that of the related art.

Solution to Problem

To solve the aforementioned problems, an optical fiber characteristics measurement apparatus according to one aspect of the present invention includes: a light source (11) configured to output continuous light (L1) of which frequency is modulated; a first optical splitter (12) configured to split the continuous light into pump light (LP) and reference light (LR); a pulser (13) configured to pulse the pump light; a second optical splitter (14) configured to cause the pulsed pump light to be incident from one end of an optical fiber (FUT) and output backscattered light (LS) generated due to Brillouin scattering in the optical fiber; a detector (17) configured to detect interference light between the backscattered light and the reference light; a cutout unit (18, 20a, 34, 41, 42a) configured to cut out a detection signal output from the detector at predetermined time intervals; and a measurer (19, 35a, 35b) configured to measure characteristics of the optical fiber individually using the detection signal for each of the predetermined time intervals cut out by the cutout unit.

Furthermore, in the optical fiber characteristics measurement apparatus according to one of the present invention, the measurer includes a frequency analyzer (19a) configured to obtain a Brillouin frequency shift amount from the detection signal.

Furthermore, in the optical fiber characteristics measurement apparatus according to one of the present invention, a plurality of frequency analyzers (19a to 19d) is provided, and the cutout unit includes a switch (18) configured to switch a connection of the detector to any of the plurality of frequency analyzers; and a controller (20a) configured to perform switching of the switch in consideration of a time when the backscattered light reaches the detector.

Furthermore, the optical fiber characteristics measurement apparatus according to one aspect of the present invention further includes a frequency shifter (32) configured to shift a frequency of the pump light or the reference light; and a converter (33) provided between the detector and the cutout unit and configured to convert the detection signal output from the detector to detection data that is a digital signal.

Furthermore, in the optical fiber characteristics measurement apparatus according to one of the present invention, the frequency shifter is configured to shift the frequency of the pump light by a frequency close to a Brillouin frequency shift amount.

Furthermore, in the optical fiber characteristics measurement apparatus according to one of the present invention, the cutout unit includes a storage (34) including a plurality of memories (34a to 34d) configured to store the detection data; a switch (18) configured to switch a connection of the converter to any of the plurality of memories; and a controller (20a) configured to perform switching of the switch in consideration of a time when the backscattered light reaches the detector.

Furthermore, in the optical fiber characteristics measurement apparatus according to one of the present invention, the measurer includes a calculator (35a) configured to perform a fast Fourier transform on the detection data individually read from the plurality of memories to obtain spectral data; and a frequency analyzer (35b) configured to obtain a Brillouin frequency shift amount from the spectral data obtained by the calculator.

Furthermore, in the optical fiber characteristics measurement apparatus according to one of the present invention, the frequency shifter is configured to sweep a shift amount of the frequency of the pump light at a predetermined period, and the measurer includes a frequency analyzer (35b) configured to obtain a Brillouin frequency shift amount from the detection data read individually from the plurality of memories.

Furthermore, in the optical fiber characteristics measurement apparatus according to one of the present invention, the cutout unit includes a reader (42a) configured to individually read the detection data at the predetermined time intervals in consideration of a time when the backscattered light reaches the detector, and the measurer is configured to measure characteristics of the optical fiber from the detection data individually read by the reader.

Furthermore, in the optical fiber characteristics measurement apparatus according to one of the present invention, the measurer includes a calculator (35a) configured to perform a fast Fourier transform on the detection data individually read by the reader to obtain spectral data; and a frequency analyzer (35b) configured to obtain a Brillouin frequency shift amount from the spectral data obtained by the calculator.

Furthermore, in the optical fiber characteristics measurement apparatus according to one of the present invention, the frequency shifter is configured to sweep a shift amount of the frequency of the pump light at a predetermined period, and the measurer includes a frequency analyzer configured to obtain a Brillouin frequency shift amount from the detection data read individually by the reader.

Furthermore, in the optical fiber characteristics measurement apparatus according to one of the present invention, the cutout unit includes a memory (41) configured to store the detection data, and the reader is configured to individually read the detection data stored in the memory at the predetermined time intervals in consideration of a time when the backscattered light reaches the detector.

An optical fiber characteristics measurement method according to one aspect of the present invention includes: outputting, by a light source (11), continuous light (L1) of which frequency is modulated; splitting, by a first optical splitter (12), the continuous light into pump light (LP) and reference light (LR); pulsing the pump light by a pulser (13); causing, by a second optical splitter (14), the pulsed pump light to be incident from one end of an optical fiber (FUT); outputting, by the second optical splitter, backscattered light (LS) generated due to Brillouin scattering in the optical fiber; detecting, by a detector (17), interference light between the backscattered light and the reference light; cutting out, by a cutout unit (18, 20a, 34, 41, 42a), a detection signal output from the detector at predetermined time intervals; and measuring, by a measurer (19, 35a, 35b), characteristics of the optical fiber individually using the detection signal for each of the predetermined time intervals cut out by the cutout unit.

Furthermore, in the optical fiber characteristics measurement method according to one aspect of the present invention, the measurer includes a frequency analyzer (19a), and the optical fiber characteristics measurement method further includes: obtaining, by the frequency analyzer, a Brillouin frequency shift amount from the detection signal.

Furthermore, in the optical fiber characteristics measurement method according to one aspect of the present invention, a plurality of frequency analyzers (19a to 19d) are provided, the cutout unit includes a switch (18) and a controller (20a), and the optical fiber characteristics measurement method further includes: switching, by the switch, a connection of the detector to any of the plurality of frequency analyzers; and performing, by the controller, switching of the switch in consideration of a time when the backscattered light reaches the detector.

Furthermore, the optical fiber characteristics measurement method according to one aspect of the present invention further includes: shifting, by a frequency shifter (32), a frequency of the pump light or the reference light; and converting, by a converter (33) provided between the detector and the cutout unit, the detection signal output from the detector to detection data that is a digital signal.

Furthermore, the optical fiber characteristics measurement method according to one aspect of the present invention further includes: shifting, by the frequency shifter, the frequency of the pump light by a frequency close to a Brillouin frequency shift amount.

Furthermore, in the optical fiber characteristics measurement method according to one aspect of the present invention, the cutout unit includes a storage (34) including a plurality of memories (34a to 34d), a switch (18), and a controller (20a), and the optical fiber characteristics measurement method further includes: storing the detection data by the storage; switching, by the switch, a connection of the converter to any of the plurality of memories; and performing, by the controller, switching of the switch in consideration of a time when the backscattered light reaches the detector.

Furthermore, in the optical fiber characteristics measurement method according to one aspect of the present invention, the measurer includes a calculator (35a) and a frequency analyzer (35b), and the optical fiber characteristics measurement method further includes: performing, by the calculator, a fast Fourier transform on the detection data individually read from the plurality of memories to obtain spectral data; and obtaining, by the frequency analyzer, a Brillouin frequency shift amount from the spectral data obtained by the calculator.

Furthermore, the optical fiber characteristics measurement method according to one aspect of the present invention further includes: sweeping, by the frequency shifter, a shift amount of the frequency of the pump light at a predetermined period, the measurer includes a frequency analyzer (35b), and the optical fiber characteristics measurement method further includes: obtaining, by the frequency analyzer, a Brillouin frequency shift amount from the detection data read individually from the plurality of memories.

Further features and aspects of the present disclosure will become apparent from the following detailed description of exemplary embodiments with reference to the attached drawings.

Advantageous Effects of Invention

According to the present invention, there is an effect that it is possible to shorten the time required for measurement of the characteristics of the measurement optical fiber as compared with that of the related art.

DESCRIPTION OF EMBODIMENTS

Hereinafter, an optical fiber characteristics measurement apparatus and an optical fiber characteristics measurement method according to embodiments of the present invention will be described in detail with reference to the drawings.

First Embodiment

<Configuration of Optical Fiber Characteristics Measurement Apparatus>

Figure 1:
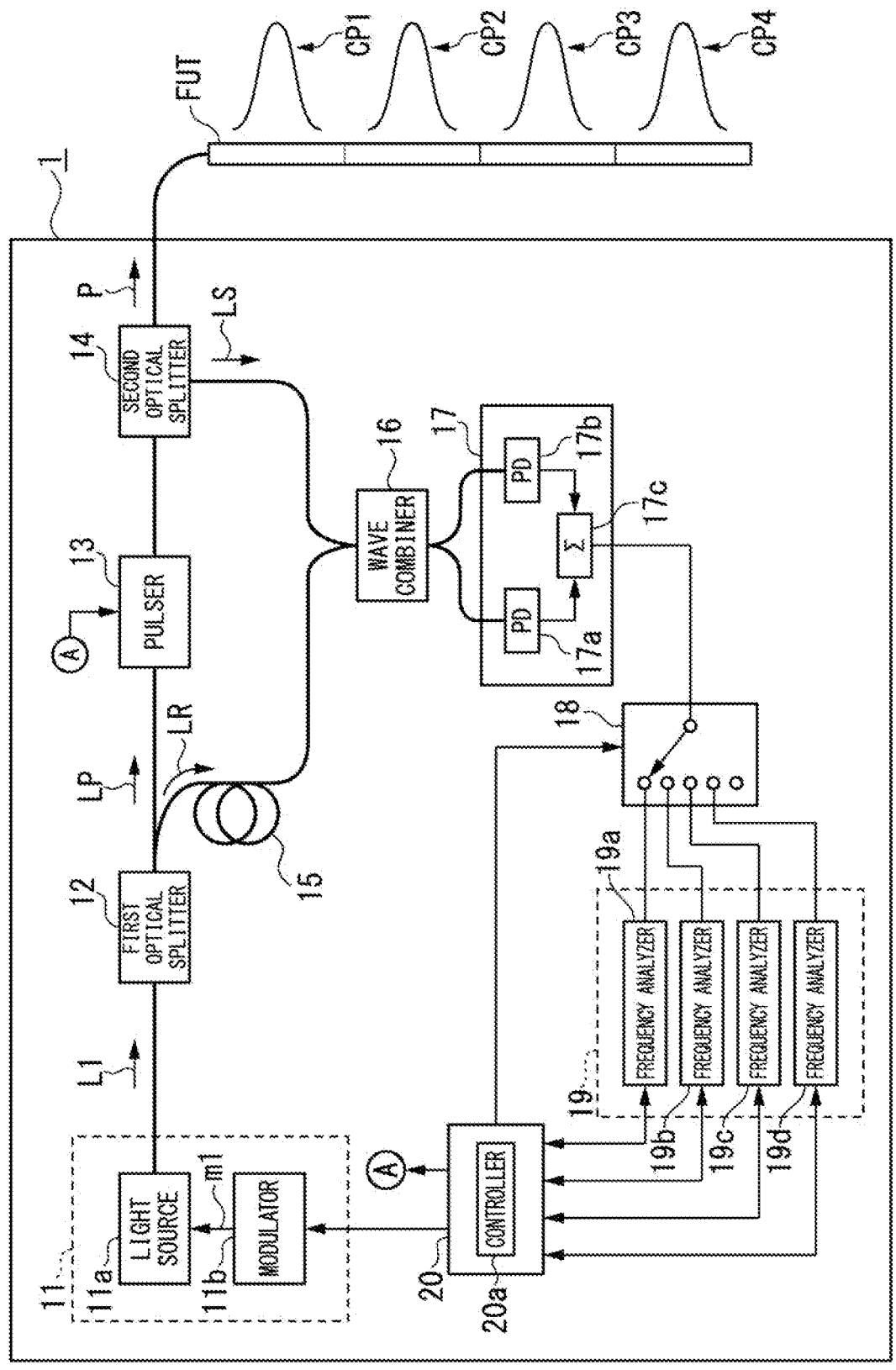
FIG. 1 is a block diagram illustrating a main configuration of an optical fiber characteristics measurement apparatus according to a first embodiment of the present invention.

FIG. 1 is a block diagram illustrating a main configuration of an optical fiber characteristics measurement apparatus according to a first embodiment of the present invention. As illustrated in FIG. 1, the optical fiber characteristics measurement apparatus 1 of the present embodiment includes a light source 11, a first optical splitter 12, a pulser 13, a second optical splitter 14, an optical delay 15, a wave combiner 16, a detector 17, a switch 18 (cutout unit), a measurer 19, and a control device 20.

The optical fiber characteristics measurement apparatus 1 of the present embodiment is an optical fiber characteristics measurement apparatus of a so-called BOCDR system that measures characteristics of a measurement optical fiber FUT on the basis of backscattered light LS obtained by causing the pump pulse light P to be incident on the measurement optical fiber FUT. The pump pulse light P is light obtained by pulsing the pump light LP serving as continuous light subjected to frequency modulation. Further, the backscattered light LS is backscattered light that is generated due to Brillouin scattering in the measurement optical fiber FUT.

Any measurement optical fiber FUT may be used depending on a wavelength of the pump pulse light P or the like. Further, in the present embodiment, it is assumed that a length of the measurement optical fiber FUT is longer than an interval dm between correlation peaks, and the measurement optical fiber FUT has a plurality of correlation peaks. In addition, in FIG. 1, four correlation peaks CP1 to CP4 present in the measurement optical fiber FUT are illustrated for easy understanding.

The light source 11 includes a light source 11a and a modulator 11b, and outputs continuous light L1 frequency-modulated under the control of the control device 20. The light source 11a includes, for example, a semiconductor laser element such as a distributed feedback laser diode (DFB-LD), and outputs the continuous light L1 frequency-modulated according to a modulation signal m1 output from the modulator 11b. The modulator 11b outputs the modulation signal m1 for frequency-modulating the continuous light L1 output from the light source 11a under the control of the control device 20. The modulation signal m1 is, for example, a sinusoidal signal, and a frequency (a modulation frequency fm) and amplitude of the modulation signal m1 are controlled by the control device 20.

The first optical splitter 12 splits the continuous light L1 output from the light source 11 into the pump light LP having a predetermined intensity ratio (for example, 1:1) and a reference light LR. The pulser 13 pulses the pump light LP after splitting by the first optical splitter 12 under the control of the control device 20. For example, the pulser 13 shapes the pump light LP into a pulse shape by performing intensity modulation on the pump light LP. Such a pulser 13 is provided to obtain the pump pulse light P that is used in a temporal gate method. Here, a pulse width tpw of the pump pulse light P is set so that only one correlation peak is included in the pump pulse light P when the pump pulse light P propagates in the measurement optical fiber FUT. Specifically, the pulse width tpw of the pump pulse light P is set so that Equation (1) below is satisfied.

$$tpw \leq 1/fm \quad (1)$$

The second optical splitter 14 includes a first port, a second port, and a third port. The first port is connected to the pulser 13. The second port is connected to the measurement optical fiber FUT. The third port is connected to the wave combiner 16. The second optical splitter 14 outputs the pump pulse light P input from the first port to the second port. Further, the backscattered light LS from the measurement optical fiber FUT input from the second port is output to the third port. Such a second optical splitter 14 may be, for example, an optical circulator.

The optical delay 15 delays the reference light LR split by the first optical splitter 12 by a predetermined time. The optical delay 15 includes, for example, an optical fiber having a predetermined length. A delay time can be adjusted by changing a length of the optical fiber. Such an optical delay 15 is provided in order that a 0th-order correlation peak of which an appearance position does not move even when the modulation frequency fm is swept is arranged outside the measurement optical fiber FUT.

The wave combiner 16 combines the backscattered light LS from the measurement optical fiber FUT output from the third port of the second optical splitter 14 with the reference light LR output from the first optical splitter 12 and passing through the optical delay 15. Further, the wave combiner 16 splits combination light into two lights having a predetermined intensity ratio (for example, 1:1) and outputs the combination light to the detector 17. Each of the two beams of optical split by the wave combiner 16 includes, for example, 50% of the backscattered light from the measurement optical fiber FUT and 50% of the reference light. Such a wave combiner 16 may be, for example, an optical coupler.

The detector 17 interferes the backscattered light LS contained in the two beams of light output from the wave combiner 16 with the reference light LR to perform optical heterodyne detection. The detector 17 includes, for example, a balanced photodiode configured of two photodiodes (PD) 17a and 17b, and a wave combiner 17c. The photodiodes 17a and 17b receive the two beams of light output from the wave combiner 16 respectively. The received optical signal of the photodiode 17a and the received optical signal of the photodiode 17b are input to the wave combiner 17c. An interference signal (beat signal: detection signal) indicating a frequency difference between the backscattered light LS and the reference light LR is output from the wave combiner 17c.

The switch 18 has one input end and a plurality of (five in the example illustrated in FIG. 1) output ends. The switch 18 switches the output terminal connected to the input terminal under control of a controller 20a provided in the control device 20. The wave combiner 17c of the detector 17 is connected to the input end of the switch 18. The frequency analyzers 19a to 19d provided in the measurer 19 are connected to the four output ends among the five output ends provided in the switch 18, respectively. The remaining one output end among the five output ends provided in the switch 18 is an open end to which a device such as a frequency analyzer is not connected. Such a switch 18 may be, for example, a mechanical switch or an electronic switch.

The switch 18 is provided to cut out the detection signal output from the wave combiner 17c of the detector 17 at predetermined time intervals. Here, cutting out means extracting a necessary part from a signal that is continuous in time. Thus, the detection signal output from the wave combiner 17c of the detector 17 is cut out at predetermined time intervals because the correlation peaks selected from among a plurality of correlation peaks appearing in the measurement optical fiber FUT are sequentially changed according to the progress of the pump pulse light P incident on the measurement optical fiber FUT.

That is, in the temporal gate method of the related art, when one beam of pump pulse light P is incident on the measurement optical fiber FUT, only one correlation peak is selected. On the other hand, in the temporal gate method of the present embodiment, when one beam of pump pulse light P is incident on the measurement optical fiber FUT, different correlation peaks are sequentially selected according to the progress of the pump pulse light P. Thus, a time required for measurement of the characteristics of the measurement optical fiber FUT is shortened. Details of a time (the predetermined time) for the switch 18 to cut out the detection signal output from the wave combiner 17c of the detector 17 will be described below.

The measurer 19 includes a plurality of frequency analyzers. The measurer 19 individually inputs the detection signal (detection signal cut out at predetermined time intervals) output from the switch 18 to the plurality of frequency analyzers to measure the characteristics of the measurement optical fiber FUT. The number of frequency analyzers in the measurer 19 is set in consideration of the number of correlation peaks appearing in the measurement optical fiber FUT. For example, as illustrated in FIG. 1, when four correlation peaks CP1 to CP4 appear on the measurement optical fiber FUT, four frequency analyzers 19a to 19d corresponding to the four correlation peaks CP1 to CP4 are provided in the measurer 19.

The frequency analyzers 19a to 19d include, for example, a spectrum analyzer (ESA: Electrical Spectrum Analyzer). The frequency analyzers 19a to 19d individually obtain spectral data indicating frequency characteristics of the detection signal (detection signal cut out at predetermined time intervals) output from the switch 18. Further, the frequency analyzers 19a to 19d individually obtain a Brillouin frequency shift amount from the individually obtained spectral data. The frequency analyzers 19a to 19d may have a function of converting the individually obtained Brillouin frequency shift amount to physical information such as strain or temperature.

The control device 20 controls an overall operation of the optical fiber characteristics measurement apparatus 1 while referring to measurement results of the measurer 19. For example, the control device 20 controls the light source 11 so that the modulation frequency fm of the continuous light L1 output from the light source 11 is changed. Further, the control device 20 controls the pulser 13 so that the pump pulse light P is generated. Further, the control device 20 includes a controller 20a (cutout unit). The controller 20a performs switching control of the switch 18 in consideration of a time when the backscattered light LS from the measurement optical fiber FUT reaches the detector 17.

<Operation of Optical Fiber Characteristics Measurement Apparatus>

Figure 2:
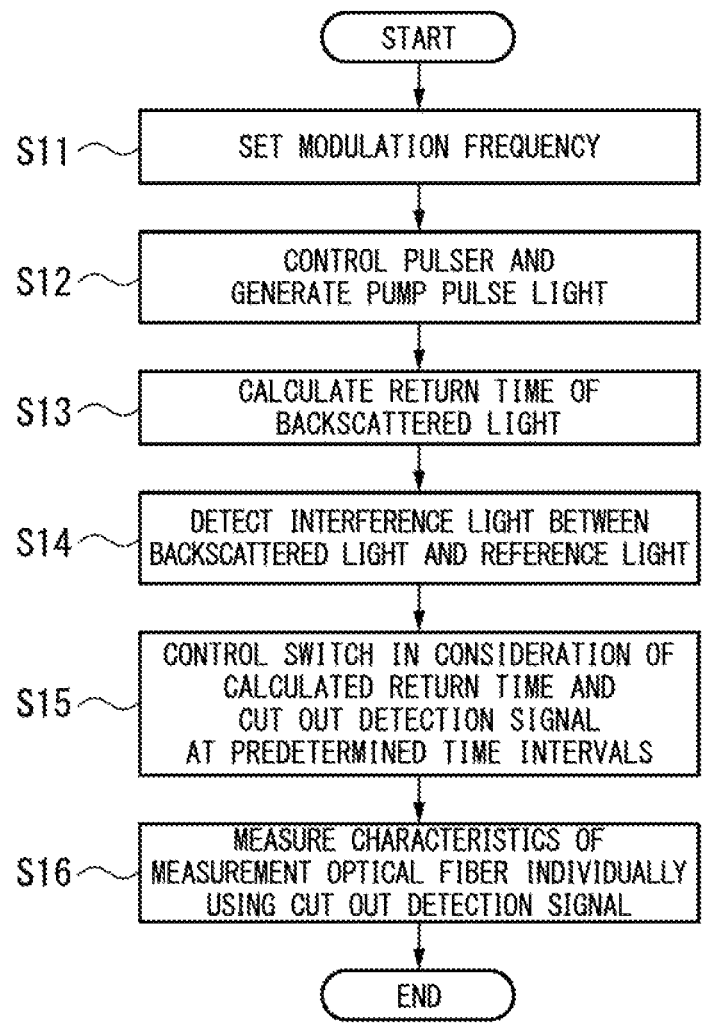
FIG. 2 is a flowchart illustrating an operation example of the optical fiber characteristics measurement apparatus according to the first embodiment of the present invention.

FIG. 2 is a flowchart illustrating an operation example of the optical fiber characteristics measurement apparatus according to the first embodiment of the present invention. The flowchart illustrated in FIG. 2 is started, for example, when an instruction to start measurement is given to the optical fiber characteristics measurement apparatus 1, and is repeatedly executed at regular intervals when the characteristics of the measurement optical fiber FUT are measured in a length direction.

When a process of the flowchart illustrated in FIG. 2 is repeated, for example, the process is repeated each time a measurement waiting time (a time required for the pump pulse light P to reciprocate in the measurement optical fiber FUT plus the pulse width tpw of the pump pulse light P) elapses. Hereinafter, a k-th process (k is an integer equal to or greater than 1) among the repeated processes of the flowchart illustrated in FIG. 2 is referred to as a "k-th process".

Setting of measurement conditions of the measurement optical fiber FUT is performed set prior to measuring the characteristics of the measurement optical fiber FUT. The setting of the measurement conditions is performed, for example, by a user operating an operator (not illustrated) provided in the control device 20. The measurement conditions for the optical fiber characteristics measurement apparatus 1 may be set one by one by the user operating an operator (not illustrated) before the start of measurement, and may be set by selecting a plurality of setting conditions stored in the control device 20 in advance.

Figure 3:
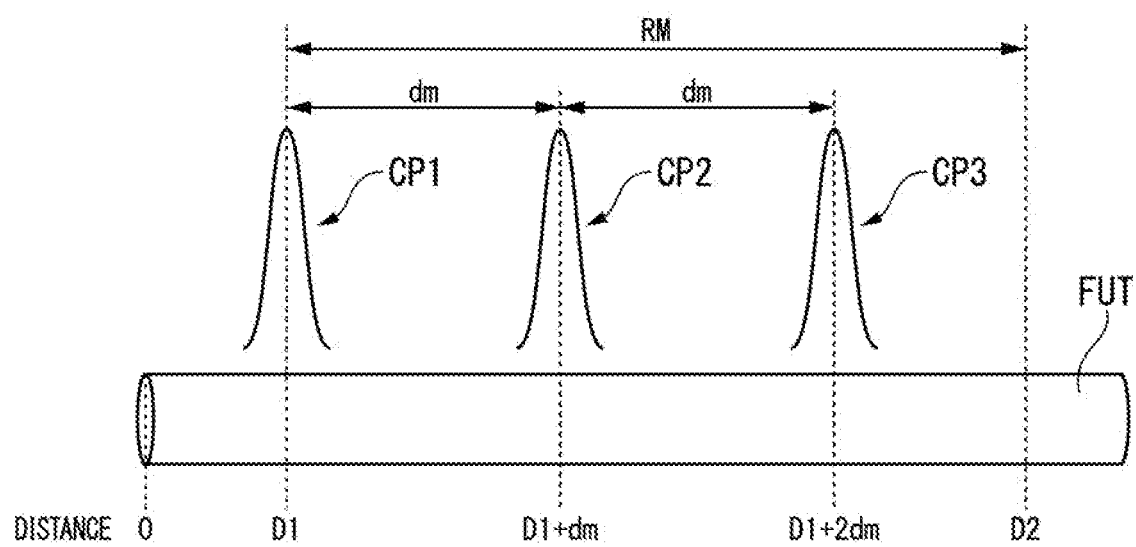
FIG. 3 is a diagram illustrating measurement conditions set in the first embodiment of the present invention.

FIG. 3 is a diagram illustrating the measurement conditions set in the first embodiment of the present invention. As illustrated in FIG. 3, an origin is a position of one end of the measurement optical fiber FUT (an end on which the pump pulse light P is incident and from which the backscattered light LS is emitted). As the measurement conditions, a measurement range RM that is a range in which the characteristics of the measurement optical fiber FUT is measured, an initial value fm0 of the modulation frequency, the pulse width tpw of the pump pulse light P, and the measurement interval ΔD, for example, are set.

In the example illustrated in FIG. 3, the measurement range RM is set as a range from D1 to D2, which are distances from the one end (origin) of the measurement optical fiber FUT. Further, the initial value fm0 of the modulation frequency is set so that the correlation peak CP1 appears at a position at which the distance from the origin is D1. The pulse width tpw of the pump pulse light P is set to a width that satisfies Equation (1) above. The measurement interval ΔD is set in consideration of resolution and the like.

The interval din between the correlation peaks is expressed by Equation (2) below, in which vg is a group velocity of light in the measurement optical fiber FUT. Therefore, when the modulation frequency fm is set, the interval dm between the correlation peaks is also set.

$$dm = vg/(2 \times fm) \quad (2)$$

Further, a position of the correlation peak CP1 changes when the modulation frequency fm changes. Therefore, when the measurement interval ΔD is set, an amount of change Δfm of the modulation frequency fm required to move the position of the correlation peak CP1 by the measurement interval ΔD is also set.

Hereinafter, it is assumed that, as illustrated in FIG. 3, three correlation peaks CP1 to CP3 appear with an interval of dm in the measurement range RM at a measurement start point in time. Positions in which the correlation peaks CP1 to CP3 appear at the measurement start point in time are as follows.

Correlation peak CP1: Position at which the distance from the origin is D1

Correlation peak CP2: Position at which the distance from the origin is D1+dm

Correlation peak CP3: Position at which the distance from the origin is D1+2×dm

<<First Process>>

When the optical fiber characteristics measurement apparatus 1 is instructed to start measurement and the process of the flowchart illustrated in FIG. 2 is started, the control device 20 of the optical fiber characteristics measurement apparatus 1 first sets the modulation frequency (step S11). Here, the initial value fm0 of the modulation frequency described above is set as the modulation frequency fm. When the modulation frequency fm is set, the modulator 11b provided in the light source 11 is controlled by the control device 20, and a frequency of the modulation signal m1 output from the modulator 11b is set to the modulation frequency fm. When such a modulation signal m1 is input to the light source 1a, the continuous light L1 frequency-modulated with the modulation frequency fm is emitted from the light source 11a.

The continuous light L1 emitted from the light source 11a is incident on the first optical splitter 12 and is split into the pump light LP and the reference light LR. The split pump light LP is incident on the pulser 13. The pulser 13 is controlled by the control device 20, and shapes the pump light LP into a pulse shape to generate the pump pulse light P (step S12). The pump pulse light P generated by the pulser 13 is incident on the measurement optical fiber FUT via the second optical splitter 14. A time when a front edge of the pump pulse light P is incident on the one end (origin) of the measurement optical fiber FUT is set to 0.

The pump pulse light P incident on the measurement optical fiber FUT propagates in the measurement optical fiber FUT. The pump pulse light P sequentially passes through the position at which the correlation peak CP1 appears (the position at which the distance from the origin is D1), the position at which the correlation peak CP2 appears (the position at which the distance from the origin is D1+dm), and the position at which the correlation peak CP3 appears (the position at which the distance from the origin is D1+2×dm). When the pump pulse light P sequentially passes through the positions at which the correlation peaks CP1 to CP3 appear, backscattered light LS due to Brillouin scattering is sequentially generated at the respective positions. The backscattered light LS generated at each position propagates in a direction opposite to a direction in which the pump pulse light P propagates, and is sequentially emitted from the one end of the measurement optical fiber FUT.

After the process of generating the pump pulse light P described above is performed, the control device 20 calculates a return time of the backscattered light LS generated at each of the positions at which the correlation peaks CP1 to CP3 appear (step S13). Here, times t1 to t3 when the front edge of the pump pulse light P reaches the positions at which the correlation peaks CP1 to CP3 appear after the pump pulse light P is incident on the measurement optical fiber FUT are as follows.

Time $t1=D1/vg$

Time $t2=(D1+dm)/vg$

Time $t3=(D1+2\times dm)/vg$

Here, the backscattered light LS generated at the position at which the correlation peak CP1 appears is referred to as backscattered light LS1, the backscattered light LS generated at the position at which the correlation peak CP2 appears is referred to as backscattered light LS2, and the backscattered light LS generated at the position at which the correlation peak CP3 appears is referred to as backscattered light LS3. The times when the backscattered lights LS1 to LS3 reach the one end (origin) of the measurement optical fiber FUT are as follows.

Backscattered light $LS1$: $(2\times t1)$ to $(2\times t1+tpw)$

Backscattered light $LS2$: $(2\times t2)$ to $(2\times t2+tpw)$

Backscattered light $LS3$: $(2\times t3)$ to $(2\times t3+tpw)$

Here, a time required for the backscattered light LS emitted from the one end of the measurement optical fiber FUT to reach the detector 17 sequentially passing through the second optical splitter 14 and the wave combiner 16 is set to 0 in order to simplify the description. Times when the backscattered lights LS1 to LS3 reach the detector 17 can be regarded as the times when the backscattered lights LS1 to LS3 reach the one end (origin) of the measurement optical fiber FUT.

The backscattered light LS (backscattered light LS1 to LS3) emitted from the one end of the measurement optical fiber FUT is incident on the wave combiner 16 through the second optical splitter 14. The backscattered light LS incident on the wave combiner 16 is combined with the reference light LR split by the first optical splitter 12 and passing through the optical delay 15. The detector 17 detects the interference light generated due to wave combination (step S14). When the interference light is detected, the detector 17 outputs a detection signal to the switch 18.

Then, the controller 20a of the control device 20 controls the switch 18 in consideration of the return time calculated in step S13, and cuts out the detection signal at predetermined time intervals (step S15). Specifically, the controller 20a of the control device 20 controls the switch 18 so that the frequency analyzer 19a is connected to the detector 17 between a time $(2\times t1)$ and a time $(2\times t1+tpw)$, the frequency analyzer 19b is connected to the detector 17 between a time $(2\times t2)$ and a time $(2\times t2+tpw)$, and the frequency analyzer 19c is connected to the detector 17 between a time $(2\times t3)$ and a time $(2\times t3+tpw)$. The controller 20a of the control device 20 controls the switch 18 so that the output end that is an open end of the switch 18 is connected to the detector 17 at a time other than the above times.

That is, among the detection signals output from the detector 17, the detection signal between the time $(2\times t1)$ and the time $(2\times t1+tpw)$ is cut out and input to the frequency analyzer 19a. Further, among the detection signals output from the detector 17, the detection signal between the time $(2\times t2)$ and the time $(2\times t2+tpw)$ is cut out and input to the frequency analyzer 19b. Further, among the detection signals output from the detector 17, the detection signal between the time $(2\times t3)$ and the time $(2\times t3+tpw)$ is cut out and input to the frequency analyzer 19c.

When the detection signal cut out by the switch 18 is input to the frequency analyzers 19a to 19c, the frequency analyzers 19a to 19c individually perform a process of measuring the characteristics of the measurement optical fiber FUT using the cutout detection signal (step S16). Specifically, the frequency analyzers 19a to 19c individually perform a process of obtaining the spectral data of the detection signal cut out by the switch 18 and obtaining the Brillouin frequency shift amount from the obtained spectral data. The obtained Brillouin frequency shift amount is output to the control device 20.

<<Second Process>>

When the process is started, the control device 20 first sets the modulation frequency (step S11). Here, since the position of the correlation peak CP1 is changed by the measurement interval $\Delta D$, the modulation frequency is set to $(fm+\Delta fm)$. It is assumed that the interval between the correlation peaks changes to $(dm+\Delta dm)$ because the modulation frequency is set to $(fm+\Delta fm)$.

When the above setting is performed, the continuous light L1 frequency-modulated with the modulation frequency $(fm+\Delta fm)$ is emitted from the light source 11a. The continuous light L1 emitted from the light source 11a is split into the pump light LP and the reference light LR by the first optical splitter 12, as in the first process. When the split pump light LP is incident on the pulser 13, the pulser 13 generates the pump pulse light P (step S12). The generated pump pulse light P is incident on the measurement optical fiber FUT via the second optical splitter 14. In the second process, the time when the front edge of the pump pulse light P is incident on the one end (origin) of the measurement optical fiber FUT is also set to 0.

The pump pulse light P incident on the measurement optical fiber FUT propagates in the measurement optical fiber FUT. The pump pulse light P sequentially passes through the position at which the correlation peak CP1 appears, the position at which the correlation peak CP2 appears, and the position at which the correlation peak CP3 appears. The positions at which the correlation peaks CP1 to CP3 appear are as follows.

Correlation peak CP1: Position at which a distance from the origin is $D1+\Delta D$ Correlation peak CP2: Position at which the distance from the origin is $D1+\Delta D+dm+\Delta dm$ Correlation peak CP3: Position at which the distance from the origin is $D1+\Delta D+2\times(dm+\Delta dm)$ Here, when a relationship of $\Delta D \gg \Delta dm$ and a relationship of $\Delta D \gg (2\times \Delta dm)$ are established so that the measurement interval $\Delta D$ is maintained with sufficient accuracy, the positions at which the correlation peaks CP1 to CP3 appear can be expressed as follows.

Correlation peak CP1: Position at which the distance from the origin is $D1+\Delta D$ Correlation peak CP2: Position at which the distance from the origin is $D1+dm+\Delta D$ Correlation peak CP3: Position at which the distance from the origin is $D1+2\times dm+\Delta D$ That is, the positions at which the correlation peaks CP1 to CP3 appear can be expressed as positions deviated by the measurement interval $\Delta D$ from the positions at which the correlation peaks CP1 to CP3 appear in the first process.

When the pump pulse light P sequentially passes through the positions at which the correlation peaks CP1 to CP3 appear, backscattered light LS due to Brillouin scattering is sequentially generated at the respective positions. The backscattered light LS (backscattered light LS1 to LS3) generated at the respective positions propagates in a direction opposite to a direction in which the pump pulse light P propagates, and is sequentially emitted from the one end of the measurement optical fiber FUT.

After the process of generating the pump pulse light P described above is performed, the control device 20 calculates the return time of the backscattered light LS generated at each of the positions at which the correlation peaks CP1 to CP3 appear (step S13). Here, times t1 to t3, when the front edge of the pump pulse light P reaches the positions at which the correlation peaks CP1 to CP3 appear after the pump pulse light P is incident on the measurement optical fiber FUT, are later than the times t1 to t3 in the first process by the measurement interval ΔD, respectively.

Specifically, the times are as follows.

Time $t1=(D1+\Delta D)/vg$

Time $t2=(D1+dm+\Delta D)/vg$

Time $t3=(D1+2\times dm+\Delta D)/vg$

Therefore, the times when the backscattered light LS1 to LS3 generated at the positions at which the correlation peaks CP1 to CP3 appear reaches the one end (origin) of the measurement optical fiber FUT become times for the light to reciprocate to the correlation peak, the times change by an amount corresponding to twice the measurement interval ΔD.

The backscattered light LS (backscattered light LS1 to LS3) emitted from the one end of the measurement optical fiber FUT is incident on the wave combiner 16 through the second optical splitter 14. The backscattered light LS incident on the wave combiner 16 is combined with the reference light LR split by the first optical splitter 12 and passing through the optical delay 15. The detector 17 detects the interference light generated due to wave combination (step S14). When the interference light is detected, the detection signal is output from the detector 17 to the switch 18.

Then, the controller 20a of the control device 20 controls the switch 18 in consideration of the return time calculated in step S13, and cuts out the detection signal at predetermined time intervals (step S15). Here, the process to be performed is basically the same as the process performed in the first process, but timing at which the frequency analyzers 19a to 19c are connected to the detector 17 (timings at which the detection signal is cut out) changes by the amount corresponding to twice the measurement interval ΔD.

When the detection signal cut out by the switch 18 is input to the frequency analyzers 19a to 19c, the frequency analyzers 19a to 19c use the cut-out detection signal to individually perform a process of measuring the characteristics of the measurement optical fiber FUT, as in the first process (step S16). The obtained Brillouin frequency shift amount is output to the control device 20.

For a third process and subsequent processes, the same process as the second process is performed. That is, the optical fiber characteristics measurement apparatus 1 measures the characteristics of the measurement optical fiber FUT while changing the modulation frequency by Δfm and moving the positions of the correlation peaks CP1 to CP3 by the measurement interval ΔD. Therefore, description of processes after the third process will be omitted. The process of the flowchart illustrated in FIG. 2 is performed up to an M-th process. Here, M=[dm/ΔD]. A symbol "[ ]" in the left equation is a Gaussian symbol (which applies a maximum integer that does not exceed a quotient).

As described above, the optical fiber characteristics measurement apparatus 1 of the present embodiment pulses the frequency-modulated pump light LP to generate the pump pulse light P, and causes the generated pump pulse light P to be incident from the one end of the measurement optical fiber FUT. The optical fiber characteristics measurement apparatus 1 detects the interference light between the backscattered light LS generated due to Brillouin scattering in the measurement optical fiber FUT when the pump pulse light P is incident and the frequency-modulated reference light LR. The optical fiber characteristics measurement apparatus 1 cuts out the detection signal obtained by detecting the interference light at predetermined time intervals, and individually uses the cut-out detection signal at predetermined time intervals to measure the characteristics of the measurement optical fiber FUT. Accordingly, one beam of pump pulse light P is caused to be incident on the measurement optical fiber FUT, making it possible to measure characteristics of a plurality of places at which the correlation peak appears, and thus, it is possible to shorten the time required for measurement of the characteristics of the measurement optical fiber as compared with the time of the related art.

Specifically, when three correlation peaks CP1 to CP3 appear in the measurement range RM of the measurement optical fiber FUT as illustrated in FIG. 3, one beam of pump pulse light P is caused to be incident on the measurement optical fiber FUT, making it possible to measure characteristics of three places at which the correlation peaks CP1 to CP3 appear. Therefore, the time required for measurement of the characteristics of the measurement optical fiber FUT can be shortened to ⅓ of a time of the related art.

In the example illustrated in FIG. 3, when the correlation peaks CP1 to CP3 are moved in a length direction of the measurement optical fiber FUT, the position at which the correlation peak CP3 appears may exceed the measurement range RM. In such a case, one beam of pump pulse light P is caused to be incident on the measurement optical fiber FUT, making it possible to measure characteristics of two places at which the correlation peaks CP1 and CP2 appear, and thus, the time required for measurement of the characteristics of the measurement optical fiber FUT is half that of the related art.

In the above embodiment, the example in which the four frequency analyzers 19a to 19d are provided in the measurer 19 in consideration of the number of correlation peaks appearing in the measurement optical fiber FUT has been described. However, the number of frequency analyzers provided in the measurer 19 does not necessarily have to be the same as the number of correlation peaks appearing in the measurement optical fiber FUT, and may differ from the number of correlation peaks (may be larger than the number of correlation peaks or may be smaller than the number of correlation peaks).

Further, when a frequency analyzer is capable of processing in a time sufficiently shorter than the pulse width tpw of the pump pulse light P or is capable of pipeline processing, the number of frequency analyzers provided in the measurer 19 may be only one. When the number of frequency analyzers provided in the measurer 19 is one, the detection signals sequentially cut out by the switch 18 are sequentially processed by one frequency analyzer.

Further, in the above embodiment, the example in which the frequency analyzers 19a to 19d provided in the measurer 19 include the spectrum analyzer has been described, but the frequency analyzer provided in the measurer 19 does not have to necessarily include the spectrum analyzer as long as spectral data can be obtained. The frequency analyzer provided in the measurer 19 may include an A/D converter and a fast Fourier transformer.

Further, in the above embodiment, it is considered that an amount of change N×Mm (N is the number of correlation peaks present in the measurement range) in the interval dm between the correlation peaks generated when the correlation peaks CP1 to CP3 are moved is sufficiently small. That is, the case in which a relationship of ΔD>>N×Δdm is satisfied is considered. It is considered that, when this relationship is not satisfied, an error is highly likely to be generated between a place to be observed and the position at which the correlation peak appears. It is possible to prevent the above error from being generated by setting the modulation frequency fm so that the interval din between the correlation peaks is the measurement interval ΔD.

In the above embodiment, the example in which after the process of generating the pump pulse light P (step S12 in FIG. 2) is performed, the process of calculating the return time of the backscattered light (step S13 in FIG. 2) is performed has been described. However, step S13 in FIG. 2 may be performed between step S11 and step S12 or may be performed in parallel with step S12.

Second Embodiment

<Configuration of Optical Fiber Characteristics Measurement Apparatus>

Figure 4:
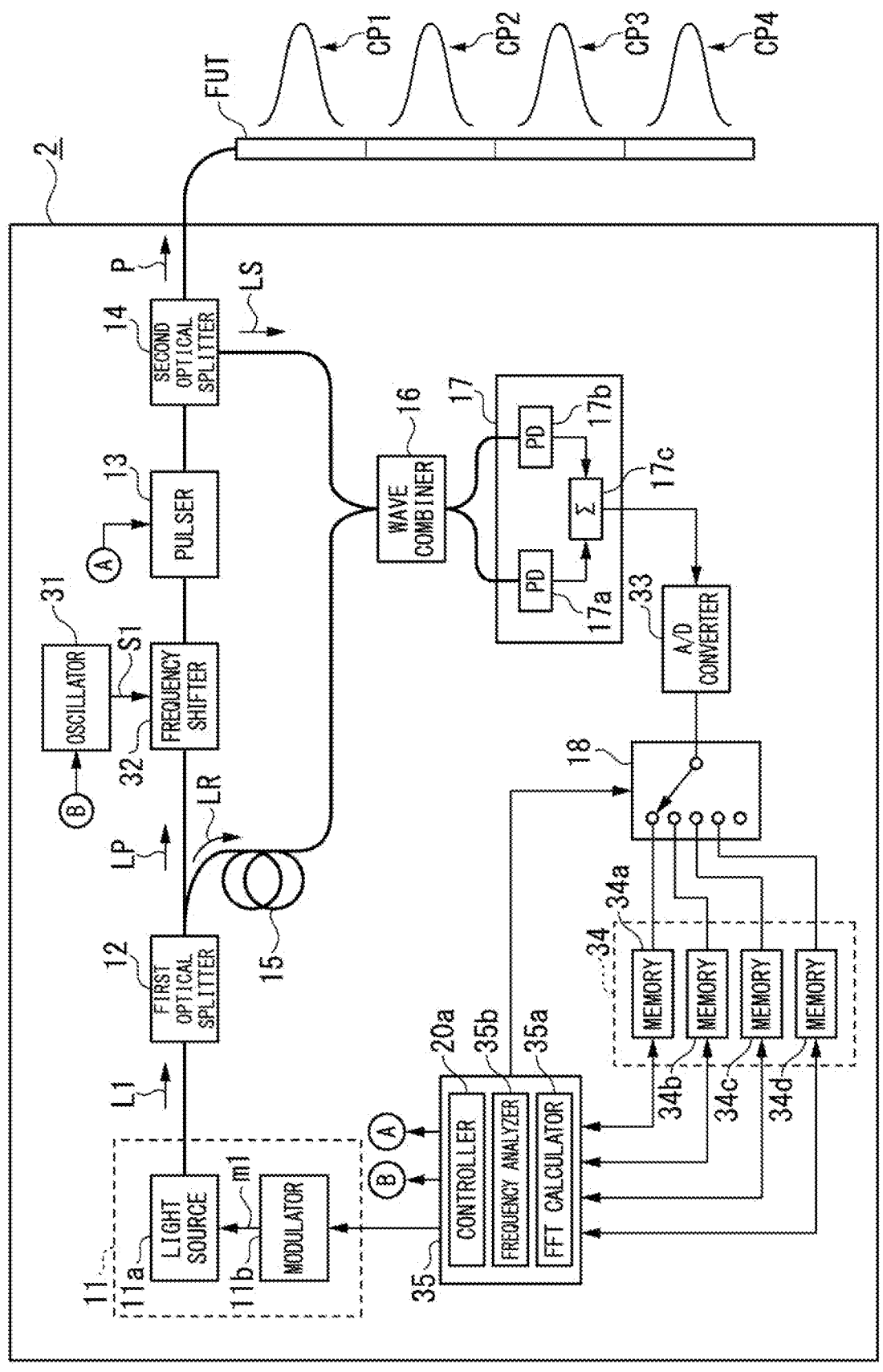
FIG. 4 is a block diagram illustrating a main configuration of an optical fiber characteristics measurement apparatus according to a second embodiment of the present invention.

FIG. 4 is a block diagram illustrating a main configuration of the optical fiber characteristics measurement apparatus according to a second embodiment of the present invention. In FIG. 4, configurations similar to those illustrated in FIG. 1 are denoted by the same reference signs. As illustrated in FIG. 4, the optical fiber characteristics measurement apparatus 2 of the present embodiment has a configuration in which an oscillator 31, a frequency shifter 32, and an A/D converter 33 (converter) are added to the optical fiber characteristics measurement apparatus 1 illustrated in FIG. 1, and the measurer 19 and the control device 20 of the optical fiber characteristics measurement apparatus 1 are replaced with a storage 34 (cutout unit) and a control device 35, respectively.

The optical fiber characteristics measurement apparatus 2 of the present embodiment converts a frequency range of a detection signal (an interference signal indicating a frequency difference between the backscattered light LS and the reference light LR) output from the detector 17 to a frequency range near a direct current. By performing such conversion, the optical fiber characteristics measurement apparatus 2 of the present embodiment can easily perform a process (a process of obtaining the characteristics of the measurement optical fiber FUT) on the detection signal.

The oscillator 31 outputs, for example, a sinusoidal signal S1 under the control of the control device 35. A frequency of a signal S1 output from the oscillator 31 is controlled by the control device 35. Specifically, when the operation mode of the control device 35 is the first mode (an operation mode in which fast Fourier transform is performed), the frequency of the signal S1 is controlled to be a constant frequency. On the other hand, when the operation mode of the control device 35 is the second mode (an operation mode in which fast Fourier transform is not performed), the frequency of the signal S1 is controlled to change at a predetermined period. Here, the period in which the frequency of the signal S1 changes is, for example, the time required for the pump pulse light P to reciprocate in the measurement optical fiber FUT.

The frequency shifter 32 includes, for example, a single side band (SSB) modulation element. The frequency shifter 32 shifts a frequency of the pump light LP split by the first optical splitter 12 by the frequency of the signal S1 using the signal S1 output from the oscillator 31. Specifically, the frequency shifter 32 shifts the frequency of the pump light LP by a frequency close to a Brillouin frequency shift amount generated in the measurement optical fiber FUT. That is, the frequency shifter 32 shifts the frequency of the pump light LP so that a frequency difference between the Brillouin frequency shift amount and the pump light LP is in the frequency range near the direct current.

For example, when the Brillouin frequency shift amount of the measurement optical fiber FUT is about 10 GHz and the operation mode of the control device 35 is the first mode, the frequency of the signal S1 output from the oscillator 31 is about 11 GHz, and the frequency shifter 32 shifts the frequency of the pump light LP by the frequency of the signal S1. On the other hand, when the operation mode of the control device 35 is the second mode, the frequency of the signal S1 output from the oscillator 31 changes in a range of about 9.5 GHz to about 10.5 GHz in the above period, and the frequency shifter 32 shifts the frequency of the pump light LP by the frequency of the signal S1. That is, in the second mode, the frequency shifter 32 sweeps a shift amount of the frequency of the pump light LP in the above period.

The A/D converter 33 is provided between the detector 17 and the switch 18. The A/D converter 33 converts the detection signal output from the detector 17 to detection data that is a digital signal and outputs the detection signal to the switch 18. Here, in a configuration without the frequency shifter 32 as in the first embodiment, a frequency range of the detection signal output from the detector 17 is a high frequency of about 10 GHz. Therefore, it is difficult to directly input the detection signal to the A/D converter 33 in terms of price, power consumption, and data size. In the present embodiment, the frequency shifter 32 is provided to set the frequency range of the detection signal output from the detector 17 to the frequency range near the direct current (for example, a frequency of about 1 GHz) so that the use of the A/D converter 33 is facilitated.

The storage 34 includes a plurality of memories. The storage 34 individually stores the detection data (detection data cut out at predetermined time intervals) output from the switch 18 in a plurality of memories. The number of memories in the storage 34 is set in consideration of the number of correlation peaks appearing in the measurement optical fiber FUT, similar to the number of frequency analyzers in the measurer 19 illustrated in FIG. 1. For example, when the four correlation peaks CP1 to CP4 appear in the measurement optical fiber FUT as illustrated in FIG. 4, four memories 34a to 34d corresponding to the four correlation peaks CP1 to CP4 are provided in the storage 34.

The memories 34a to 34d may be, for example, a volatile semiconductor memory such as a random access memory (RAM) or a non-volatile semiconductor memory such as a flash memory. Further, the memories 34a to 34d are not limited to the semiconductor memory, and may be a hard disk drive (HDD), a solid state drive (SSD), or the like, in addition to the semiconductor memory.

The control device 35 controls an overall operation of the optical fiber characteristics measurement apparatus 2. For example, the control device 35 controls the light source 11 so that the modulation frequency fm of the continuous light L1 output from the light source 11 is changed, controls the pulser 13 so that the pump pulse light P is generated, and performs the switching control of the switch 18 in consideration of the time when the backscattered light LS from the measurement optical fiber FUT reaches the detector 17, like the control device 20 illustrated in FIG. 1. Further, the control device 35 controls the oscillator 31 so that a signal S1 having a constant frequency or a signal S1 having a frequency changing at a predetermined period is output.

The control device 35 includes an FFT calculator 35a (a calculator or a measurer), a frequency analyzer 35b (a measurer), and a controller 20a (a cutout unit). The FFT calculator 35a performs a fast Fourier transform on the detection data individually read from the memories 34a to 34d to obtain spectral data indicating the frequency characteristics of the detection data (detection data cut out at predetermined time intervals). The frequency analyzer 35b obtains the Brillouin frequency shift amount from the spectral data obtained by the FFT calculator 35a or the detection data individually read from the memories 34a to 34d.

Here, in the control device 35, two operation modes shown below are prepared. For example, the operation mode of the control device 35 is selected by the user operating an operator (not illustrated) provided in the control device 35.

First mode: Operation mode in which fast Fourier transform is performed

Second mode: Operation mode in which fast Fourier transform is not performed

When the operation mode of the control device 35 is the first mode, the oscillator 31 is controlled so that the frequency of the signal S1 becomes a constant frequency. Further, the FFT calculator 35a of the control device 35 is put in an operation state, and the frequency analyzer 35b is set to obtain the Brillouin frequency shift amount from the spectral data obtained by the FFT calculator 35a. On the other hand, when the operation mode of the control device 35 is the second mode, the oscillator 31 is controlled so that the frequency of the signal S1 changes. Further, the FFT calculator 35a of the control device 35 is put in a stopped state, and the frequency analyzer 35b is set to obtain the Brillouin frequency shift amount from the detection data individually read from the memories 34a to 34d.

<Operation of Optical Fiber Characteristics Measurement Apparatus>

A basic operation of the optical fiber characteristics measurement apparatus 2 is the same as that of the optical fiber characteristics measurement apparatus 1 illustrated in FIG. 1. Therefore, the optical fiber characteristics measurement apparatus 2 also basically performs the same process as the process of the flowchart illustrated in FIG. 2. Hereinafter, operations different from those of the optical fiber characteristics measurement apparatus 1 among operations of the optical fiber characteristics measurement apparatus 2 will be mainly described. Further, since the operation slightly differ between a case in which the operation mode of the control device 35 is the first mode and a case in which the operation mode is the second mode, the operation in the case in which the operation mode of the control device 35 is the first mode and the operation in the case in which the operation mode of the control device 35 is the second mode will be hereinafter described separately.

(1) First Mode

When the operation mode of the control device 35 is the first mode, the oscillator 31 is controlled so that the frequency of the signal S1 input to the frequency shifter 32 becomes a constant frequency. When the pump light LP split by the first optical splitter 12 is incident on the frequency shifter 32, the frequency of the pump light LP is shifted by a frequency (for example, about 11 GHz) close to the Brillouin frequency shift amount (for example, about 10 GHz) generated in the measurement optical fiber FUT. The pump light LP of which the frequency has been shifted is shaped into a pulse by the pulser 13. The pump pulse light P generated by the pulser 13 is incident on the measurement optical fiber FUT via the second optical splitter 14.

When the pump pulse light P incident on the measurement optical fiber FUT propagates in the measurement optical fiber FUT, the backscattered light LS (backscattered light LS1 to LS3) is sequentially generated as in the first embodiment and sequentially emitted from the one end of the measurement optical fiber FUT. The backscattered light LS (backscattered light LS1 to LS3) emitted from the one end of the measurement optical fiber FUT is incident on the wave combiner 16 via the second optical splitter 14. The backscattered light LS incident on the wave combiner 16 is combined with the reference light LR split by the first optical splitter 12 and passing through the optical delay 15. The detector 17 detects the interference light generated due to wave combination.

When the interference light is detected, the detection signal is output from the detector 17 to the A/D converter 33. Here, since the frequency of the pump light LP is shifted by about 11 GHz, the frequency of the detection signal output from the detector 17 is about 1 GHz when the Brillouin frequency shift amount of the measurement optical fiber FUT is about 10 GHz. The detection signal output from the detector 17 to the A/D converter 33 is converted to the detection data that is a digital signal by the A/D converter 33 and output to the switch 18.

Then, the controller 20a of the control device 35 controls the switch 18 in consideration of the return time of the backscattered light LS, and cuts out the detection data at predetermined time intervals, as in the first embodiment. The detection data cut out at predetermined time intervals are sequentially stored in the memories 34a to 34c. The detection data stored in the memories 34a to 34c are individually and sequentially read under the control of the control device 35.

Subsequently, the FFT calculator 35a performs a fast Fourier transform on the detection data read from the memories 34a to 34c to obtain spectral data indicating the frequency characteristics of the detection data. The spectral data obtained by the FFT calculator 35a is sequentially output to the frequency analyzer 35b. The frequency analyzer 35b obtains the Brillouin frequency shift amount from the spectral data obtained by the FFT calculator 35a. This process is repeatedly performed while changing the modulation frequency by Δfm and moving the positions of the correlation peaks CP1 to CP3 by the measurement interval ΔD.

(2) Second Mode

When the operation mode of the control device 35 is the second mode, the oscillator 31 is controlled so that the frequency of the signal S1 input to the frequency shifter 32 changes. When the pump light LP split by the first optical splitter 12 is incident on the frequency shifter 32, the frequency of the pump light LP is shifted by a frequency (for example, in a range from about 9.5 GHz to 10.5 GHz) close to the Brillouin frequency shift amount generated in the measurement optical fiber FUT, as in the case in which the operation mode of the control device 35 is the first mode. However, shift amount of the frequency of the pump light LP is swept at a predetermined period (for example, the time required for the pump pulse light P to reciprocate in the measurement optical fiber FUT). The pump light LP of which the frequency has been shifted is shaped into a pulse by the pulser 13. The pump pulse light P generated by the pulser 13 is incident on the measurement optical fiber FUT via the second optical splitter 14.

When the pump pulse light P incident on the measurement optical fiber FUT propagates in the measurement optical fiber FUT, the backscattered light LS (backscattered light LS1 to LS3) is sequentially generated and sequentially emitted from the one end of the measurement optical fiber FUT, as in the case in which the operation mode of the control device 35 is the first mode. The backscattered light LS (backscattered light LS1 to LS3) emitted from the one end of the measurement optical fiber FUT is incident on the wave combiner 16 through the second optical splitter 14. The backscattered light LS incident on the wave combiner 16 is combined with the reference light LR split by the first optical splitter 12 and passing through the optical delay 15. The detector 17 detects the interference light generated due to wave combination.

The detection signal output from the detector 17 to the A/D converter 33 is converted to the detection data that is a digital signal by the A/D converter 33 and output to the switch 18. Then, the controller 20*a* of the control device 35 controls the switch 18 in consideration of the return time of the backscattered light LS, and cuts out the detection data at predetermined time intervals, as in a case in which the operation mode of the control device 35 is the first mode. The detection data cut out at predetermined time intervals are sequentially stored in the memories 34*a* to 34*c*. Here, since shift amount of the frequency of the pump light LP is swept at a predetermined period, the detection data stored in the memories 34*a* to 34*c* is spectral data.

The detection data stored in the memories 34*a* to 34*c* are individually and sequentially read under the control of the control device 35. Then, the frequency analyzer 35*b* obtains the Brillouin frequency shift amount from the detection data individually and sequentially read from the memories 34*a* to 34*c*. This process is repeatedly performed while changing the modulation frequency by Δfm and moving the positions of the correlation peaks CP1 to CP3 by the measurement interval ΔD.

As described above, the optical fiber characteristics measurement apparatus 2 of the present embodiment shifts the frequency of the pump light LP by the frequency close to the Brillouin frequency shift amount generated in the measurement optical fiber FUT using the frequency shifter 32, thereby converting the frequency range of the detection signal output from the detector 17 to the frequency range near the direct current. Therefore, it is possible to easily perform the process of converting the detection signal to detection data that is a digital signal and obtaining the characteristics of the measurement optical fiber FUT.

Further, in the present embodiment, the optical fiber characteristics measurement apparatus 2 cuts out the detection data at predetermined time intervals and individually uses the cut-out detection data for each predetermined time to measure the characteristics of the measurement optical fiber FUT, as in the first embodiment. Accordingly, one beam of pump pulse light P is caused to be incident on the measurement optical fiber FUT, making it possible to measure characteristics of a plurality of places at which the correlation peak appears, and thus, it is possible to shorten the time required for measurement of the characteristics of the measurement optical fiber as compared with the time of the related art.

In the above embodiments, an example in which the four memories 34*a* to 34*d* are provided in the storage 34 in consideration of the number of correlation peaks appearing in the measurement optical fiber FUT has been described. However, the number of memories provided in the storage 34 does not necessarily have to be the same as the number of correlation peaks appearing in the measurement optical fiber FUT, and may differ from the number of correlation peaks (may be larger than the number of correlation peaks or may be smaller than the number of correlation peaks).

Further, in the above embodiments, an example in which the frequency of the pump light LP split by the first optical splitter 12 is shifted has been described. However, a frequency of the reference light LR split by the first optical splitter 12 may be shifted instead of the frequency of the pump light LP being shifted. That is, the frequency of either the pump light LP or the reference light LR split by the first optical splitter 12 may be shifted.

Third Embodiment

<Configuration of Optical Fiber Characteristics Measurement Apparatus>

Figure 5:
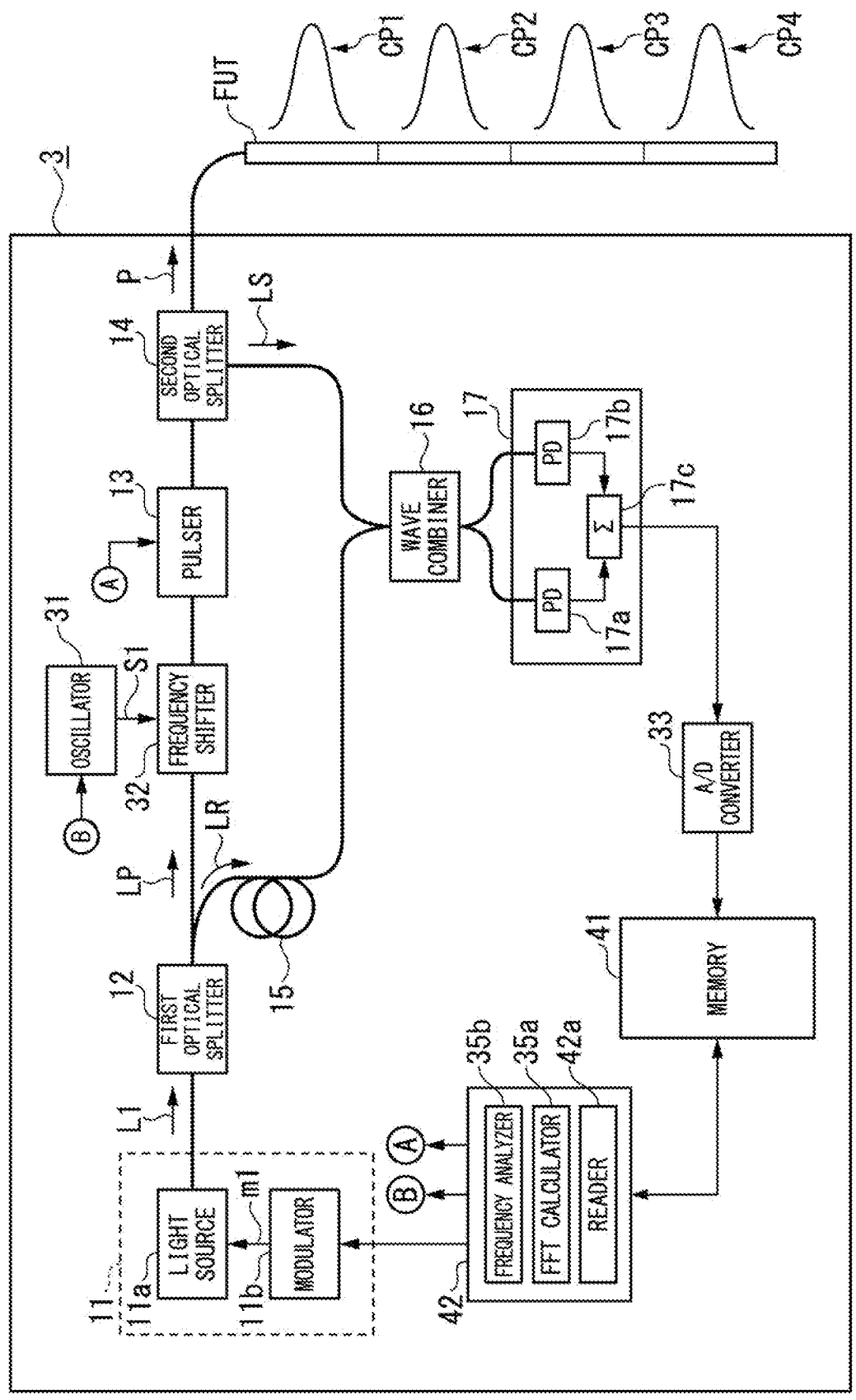
FIG. 5 is a block diagram illustrating a main configuration of an optical fiber characteristics measurement apparatus according to a third embodiment of the present invention.

FIG. 5 is a block diagram illustrating a main configuration of an optical fiber characteristics measurement apparatus according to a third embodiment of the present invention. In FIG. 5, the same configurations as those illustrated in FIG. 4 are denoted by the same reference signs. As illustrated in FIG. 5, in an optical fiber characteristics measurement apparatus 3 of the present embodiment, the switch 18 of the optical fiber characteristics measurement apparatus 2 illustrated in FIG. 4 is omitted, and the storage 34 and the control device 35 of the optical fiber characteristics measurement apparatus 2 are replaced with a memory 41 (cutout unit) and a control device 42, respectively.

The optical fiber characteristics measurement apparatus 2 illustrated in FIG. 4 individually stores the detection data cut out at predetermined time intervals by the switch 18 in a plurality of memories. On the other hand, the optical fiber characteristics measurement apparatus 3 of the present embodiment stores all pieces of detection data in the memory 41, and individually reads the detection data stored in the memory 41 at predetermined time intervals in consideration of the time when the backscattered light LS reaches the detector 17. That is, the optical fiber characteristics measurement apparatus 2 illustrated in FIG. 4 cuts out the detection data before storing the detection data in the memory, whereas the optical fiber characteristics measurement apparatus 3 of the present embodiment stores the detection data in the memory and then cuts out the detection data.

The memory 41 may be, for example, a volatile semiconductor memory such as a RAM or a non-volatile semiconductor memory such as a flash memory, similar to the memories 34*a* to 34*d* illustrated in FIG. 4. Further, the memory 41 is not limited to the semiconductor memory, and may be a hard disk drive (HDD), a solid state drive (SSD), or the like, in addition to the semiconductor memory.

The control device 42 controls an overall operation of the optical fiber characteristics measurement apparatus 3. For example, the control device 42 controls the light source 11 so that the modulation frequency fm of the continuous light L1 output from the light source 11 is changed, controls the pulser 13 so that the pump pulse light P is generated, and controls the oscillator 31 so that a signal S1 having a constant frequency or a signal S1 having a frequency changing at a predetermined period is output, like the control device 35 illustrated in FIG. 4.

The control device 42 includes a reader 42a (cutout unit) in addition to the FFT calculator 35a and the frequency analyzer 35b illustrated in FIG. 4. The reader 42a individually reads the detection data stored in the memory 41 at predetermined time intervals in consideration of the time when the backscattered light LS reaches the detector 17. The time when the backscattered light LS reaches the detector 17 (a return time of the backscattered light LS) is obtained by the control device 42 performing the same process as in step S13 illustrated in FIG. 2.

Here, when the detection data output from the A/D converter 33 is written to the memory 41 in the order of addresses, a time when the detection data is written to the memory 41 and an address of the memory 41 have a one-to-one correspondence relationship. The reader 42a uses a time when the writing of the detection data to the memory 41 is started, an address at which writing of the detection data to the memory 41 starts, and a sampling frequency of the A/D converter 33 to convert the time when backscattered light LS reaches the detector 17 to an address, and performs reading of necessary detection data.

Only the detection data output from the A/D converter 33 may be written to the memory 41, or additional information indicating a data order of the detection data may be written to the memory 41 together with the detection data output from the A/D converter 33. Such additional information may be, for example, time information or data number (serial number). When the time information is used as the additional information, the reader 42a reads necessary detection data by referring to the time information as the additional information. When the data number is used as the additional information, the reader 42a uses the time when the writing of the detection data to the memory 41 starts and the sampling frequency of the A/D converter 33 to convert the time when the backscattered light LS reaches the detector 17 to a data number and reads necessary detection data.

Here, in the control device 42, two operation modes (a first mode and a second mode) are prepared as in the control device 35 illustrated in FIG. 4. When the operation mode of the control device 42 is the first mode, the oscillator 31 is controlled so that the frequency of the signal S1 becomes a constant frequency. Further, the FFT calculator 35a of the control device 42 is put in an operation state to process the detection data read by the reader 42a, and the frequency analyzer 35b is set so that the Brillouin frequency shift amount is obtained from the spectral data obtained by the FFT calculator 35a. On the other hand, when the operation mode of the control device 42 is the second mode, the oscillator 31 is controlled so that the frequency of the signal S1 changes. Further, the FFT calculator 35a of the control device 42 is put in a stopped state and the frequency analyzer 35b is set so that the Brillouin frequency shift amount is obtained from the detection data read by the reader 42a.

<Operation of Optical Fiber Characteristics Measurement Apparatus>

An operation of the optical fiber characteristics measurement apparatus 3 is the same as that of the optical fiber characteristics measurement apparatus 2 illustrated in FIG. 4, except for a timing at which the detection data output from the A/D converter 33 is cut out. Therefore, the optical fiber characteristics measurement apparatus 3 also basically performs the same process as the process of the flowchart illustrated in FIG. 2. Hereinafter, among operations of the optical fiber characteristics measurement apparatus 3, those different from those of the optical fiber characteristics measurement apparatus 2 will be mainly described. Hereinafter, a case in which the operation mode of the control device 42 is the first mode will be described as an example in order to simplify description.

An operation from the emission of the continuous light L1 from the light source 11a to the detection of interference light between the backscattered light LS and the reference light LR by the detector 17 is the same as the operation performed by the optical fiber characteristics measurement apparatus 2 illustrated in FIG. 4. The detection signal output from the detector 17 to the A/D converter 33 is converted to detection data that is a digital signal by the A/D converter 33, output to the memory 41, and sequentially stored in the memory 41.

When the detection data is stored in the memory 41, the reader 42a individually reads the detection data stored in the memory 41 at predetermined time intervals in consideration of the time when the backscattered light LS reaches the detector 17. The data individually read by the reader 42a is sequentially output to the FFT calculator 35a. The FFT calculator 35a obtains spectral data indicating frequency characteristics of the detection data.

The spectral data obtained by the FFT calculator 35a is sequentially output to the frequency analyzer 35b. The frequency analyzer 35b obtains the Brillouin frequency shift amount from the spectral data obtained by the FFT calculator 35a. This process is repeatedly performed while changing the modulation frequency by Δfm and moving the positions of the correlation peaks CP1 to CP3 by the measurement interval ΔD.

The detection data may be read by the reader 42a each time the detection data is written to the memory 41, as in the second embodiment, or may be read at a timing different from that of the second embodiment. For example, when there is a margin in a capacity of the memory 41, all pieces of detection data obtained during the measurement may be stored in the memory 41, and the reader 42a may collectively read the detection data after the measurement ends. Further, when a process of the control device 42 is sufficiently fast, the memory 41 can be omitted. In such a case, the reader 42a provided in the control device 42 directly cuts out the detection data output from the A/D converter 33.

As described above, in the optical fiber characteristics measurement apparatus 3 of the present embodiment, after the detection data output from the A/D converter 33 is stored in the memory 41, the reader 42a individually reads the detection data stored in the memory 41 at predetermined time intervals in consideration of the time when the backscattered light LS reaches the detector 17. Accordingly, since the switch 18 or the plurality of memories 34a to 34d illustrated in FIG. 4 can be omitted, it is possible to simplify a device configuration. Further, for example, a flexible use method such as collectively performing reading of the detection data stored in the memory 41 after the measurement ends, to collectively obtain the characteristics of the measurement optical fiber FUT is possible.

Further, the present embodiment and the second embodiment differ only in that whether the detection data is stored in the memory and then is cut out or the detection data is cut out before being stored in the memory. Therefore, the same effects as those obtained in the second embodiment can be obtained in the present embodiment. Specifically, an effect that a process of converting the detection signal output from the detector 17 to detection data that is a digital signal and obtaining the characteristics of the measurement optical fiber FUT can be easily performed, and an effect that it is possible to shorten the time required for measurement of the characteristics of the measurement optical fiber as compared with the time of the related art can be obtained.

Although the optical fiber characteristics measurement apparatus and the optical fiber characteristics measurement method according to the embodiments of the present invention have been described above, the present invention is not limited to the embodiments and can be freely changed within the scope of the present invention. For example, in the above-described embodiments, the pulser 13 shapes the pump light LP into a pulse shape by performing intensity modulation on the pump light LP. However, a method of pulsing the pump light LP is not limited to a method of performing intensity modulation on the pump light LP. For example, the frequency modulation may be performed on the pump light LP so that an optical frequency of the pump light LP is changed to a pulse shape (the optical frequency is greatly shaken).

Further, the optical delay 15 is not only between the first optical splitter 12 and the wave combiner 16, but also between the first optical splitter 12 and the second optical splitter 14 or between the second optical splitter 14 and the wave combiner 16. Further, a first optical amplifier that amplifies the pump light LP may be provided between the first optical splitter 12 and the second optical splitter 14. Further, a second optical amplifier that amplifies the backscattered light LS may be provided between the second optical splitter 14 and the wave combiner 16. Further, a third optical amplifier that amplifies the reference light LR may be included between the first optical splitter 12 and the wave combiner 16. Further, as the frequency shifter 32, an intensity modulator may be used instead of the SSB modulator. Further, the frequency shifter 32 may be provided between the detector 17 and the A/D converter 33. Further, the modulator 11b may not directly modulate the light source 11a, but a modulator connected to an output of the light source 11a may modulate the light.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

REFERENCE SIGNS LIST 1 to 3 Optical fiber characteristics measurement apparatus
11 Light source
12 First optical splitter
13 Pulser
14 Second optical splitter
17 Detector
18 Switch
19 Measurer
19a to 19d Frequency analyzer
20 Control device
20a Controller
32 Frequency shifter
33 A/D converter
34 Storage
34a to 34d Memory
35 Control device
35a FFT calculator
35b Frequency analyzer
40 Storage
41 Memory
42a Reader
FUT Measurement optical fiber
L1 Continuous light
LP Pump light
LR Reference light
LS Backscattered light

The invention claimed is:

1. An optical fiber characteristics measurement apparatus comprising:
   a light source configured to output continuous light of which frequency is modulated;
   a first optical splitter configured to split the continuous light into pump light and reference light;
   a pulser configured to pulse the pump light;
   a second optical splitter configured to cause the pulsed pump light to be incident from one end of an optical fiber and output backscattered light generated due to Brillouin scattering in the optical fiber;
   a detector configured to detect interference light between the backscattered light and the reference light;
   a cutout unit configured to cut out a detection signal output from the detector at predetermined time intervals; and
   a measurer configured to measure characteristics of the optical fiber individually using the detection signal for each of the predetermined time intervals cut out by the cutout unit.

2. The optical fiber characteristics measurement apparatus according to claim 1, wherein the measurer comprises:
   a frequency analyzer configured to obtain a Brillouin frequency shift amount from the detection signal.

3. The optical fiber characteristics measurement apparatus according to claim 2,
   wherein a plurality of frequency analyzers is provided, and
   wherein the cutout unit comprises:
      a switch configured to switch a connection of the detector to any of the plurality of frequency analyzers; and
      a controller configured to perform switching of the switch in consideration of a time when the backscattered light reaches the detector.

4. The optical fiber characteristics measurement apparatus according to claim 1, further comprising:
   a frequency shifter configured to shift a frequency of the pump light or the reference light; and
   a converter provided between the detector and the cutout unit and configured to convert the detection signal output from the detector to detection data that is a digital signal.

5. The optical fiber characteristics measurement apparatus according to claim 4,
   wherein the frequency shifter is configured to shift the frequency of the pump light by a frequency close to a Brillouin frequency shift amount.

6. The optical fiber characteristics measurement apparatus according to claim 4, wherein the cutout unit comprises:
   a storage comprising a plurality of memories configured to store the detection data;
   a switch configured to switch a connection of the converter to any of the plurality of memories; and
   a controller configured to perform switching of the switch in consideration of a time when the backscattered light reaches the detector.

7. The optical fiber characteristics measurement apparatus according to claim 6, wherein the measurer comprises:
   a calculator configured to perform a fast Fourier transform on the detection data individually read from the plurality of memories to obtain spectral data; and
   a frequency analyzer configured to obtain a Brillouin frequency shift amount from the spectral data obtained by the calculator.

8. The optical fiber characteristics measurement apparatus according to claim 6,
   wherein the frequency shifter is configured to sweep a shift amount of the frequency of the pump light at a predetermined period, and
   wherein the measurer comprises a frequency analyzer configured to obtain a Brillouin frequency shift amount from the detection data read individually from the plurality of memories.

9. The optical fiber characteristics measurement apparatus according to claim 4,
   wherein the cutout unit comprises a reader configured to individually read the detection data at the predetermined time intervals in consideration of a time when the backscattered light reaches the detector, and
   wherein the measurer is configured to measure characteristics of the optical fiber from the detection data individually read by the reader.

10. The optical fiber characteristics measurement apparatus according to claim 9, wherein the measurer comprises:
   a calculator configured to perform a fast Fourier transform on the detection data individually read by the reader to obtain spectral data; and
   a frequency analyzer configured to obtain a Brillouin frequency shift amount from the spectral data obtained by the calculator.

11. The optical fiber characteristics measurement apparatus according to claim 9,
   wherein the frequency shifter is configured to sweep a shift amount of the frequency of the pump light at a predetermined period, and
   wherein the measurer comprises a frequency analyzer configured to obtain a Brillouin frequency shift amount from the detection data read individually by the reader.

12. The optical fiber characteristics measurement apparatus according to claim 9,
   wherein the cutout unit comprises a memory configured to store the detection data, and
   wherein the reader is configured to individually read the detection data stored in the memory at the predetermined time intervals in consideration of a time when the backscattered light reaches the detector.

13. An optical fiber characteristics measurement method comprising:
   outputting, by a light source, continuous light of which frequency is modulated;
   splitting, by a first optical splitter, the continuous light into pump light and reference light;
   pulsing the pump light by a pulser;
   causing, by a second optical splitter, the pulsed pump light to be incident from one end of an optical fiber;
   outputting, by the second optical splitter, backscattered light generated due to Brillouin scattering in the optical fiber;
   detecting, by a detector, interference light between the backscattered light and the reference light;
   cutting out, by a cutout unit, a detection signal output from the detector at predetermined time intervals; and
   measuring, by a measurer, characteristics of the optical fiber individually using the detection signal for each of the predetermined time intervals cut out by the cutout unit.

14. The optical fiber characteristics measurement method according to claim 13, further comprising:
   obtaining, by a frequency analyzer of the measurer, a Brillouin frequency shift amount from the detection signal.

15. The optical fiber characteristics measurement method according to claim 14, further comprising:
   switching, by a switch of the cutout unit, a connection of the detector to any of a plurality of frequency analyzers; and
   performing, by a controller of the cutout unit, switching of the switch in consideration of a time when the backscattered light reaches the detector.

16. The optical fiber characteristics measurement method according to claim 13, further comprising:
   shifting, by a frequency shifter, a frequency of the pump light or the reference light; and
   converting, by a converter provided between the detector and the cutout unit, the detection signal output from the detector to detection data that is a digital signal.

17. The optical fiber characteristics measurement method according to claim 16, further comprising:
   shifting, by the frequency shifter, the frequency of the pump light by a frequency close to a Brillouin frequency shift amount.

18. The optical fiber characteristics measurement method according to claim 16, further comprising:
   storing the detection data by a storage of the cutout unit;
   switching, by a switch of the cutout unit, a connection of the converter to any of the plurality of memories; and
   performing, by a controller of the cutout unit, switching of the switch in consideration of a time when the backscattered light reaches the detector.

19. The optical fiber characteristics measurement method according to claim 18, further comprising:
   performing, by a calculator of the measurer, a fast Fourier transform on the detection data individually read from the plurality of memories to obtain spectral data; and
   obtaining, by a frequency analyzer of the measurer, a Brillouin frequency shift amount from the spectral data obtained by the calculator.

20. The optical fiber characteristics measurement method according to claim 18, further comprising:
sweeping, by the frequency shifter, a shift amount of the frequency of the pump light at a predetermined period,
obtaining, by a frequency analyzer of the measurer, a Brillouin frequency shift amount from the detection data read individually from the plurality of memories.

* * * * *